T. E. MURRAY.
METER TESTING SERVICE CUT-OUT.
APPLICATION FILED DEC. 8, 1909.
1,031,363.
Patented July 2, 1912.
5 SHEETS—SHEET 1.
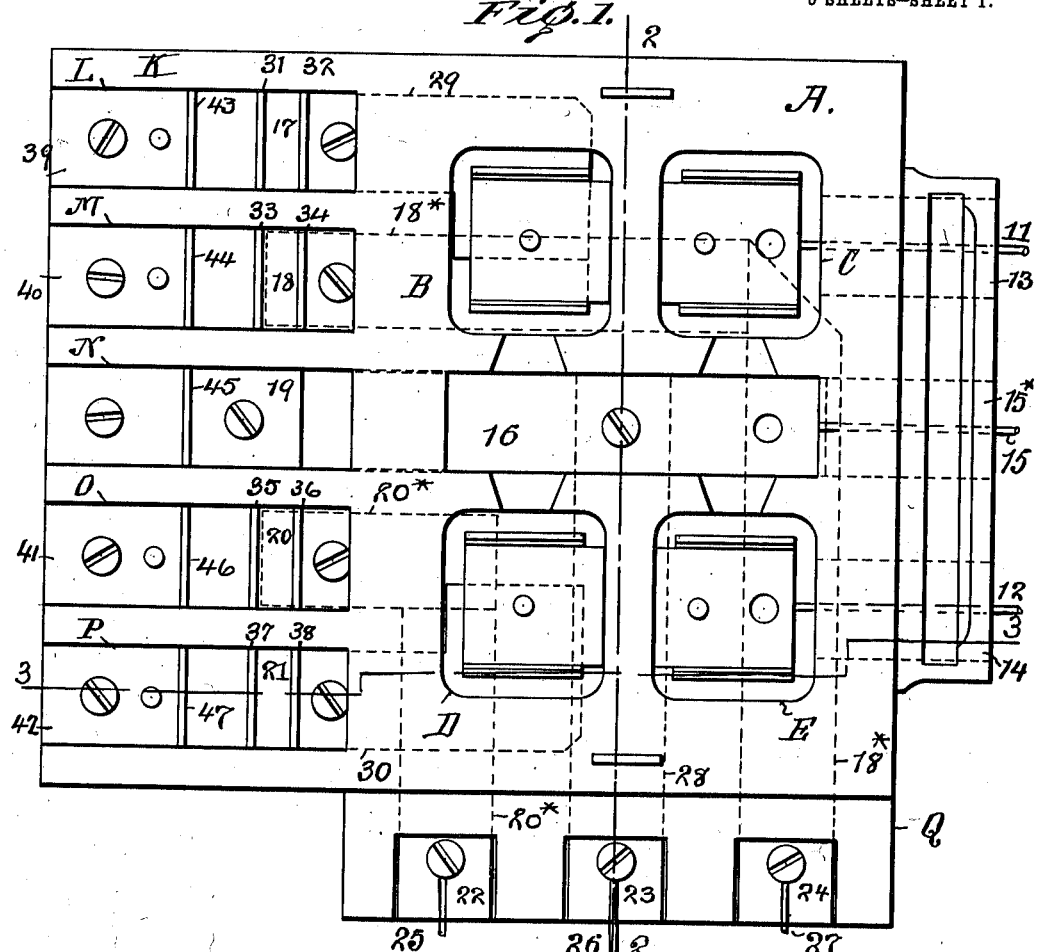
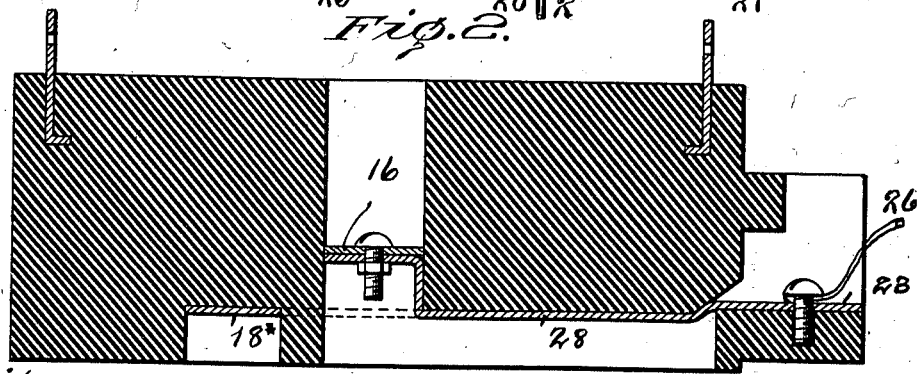

T. E. MURRAY.
METER TESTING SERVICE CUT-OUT.
APPLICATION FILED DEC. 8, 1909.
1,031,363.
Patented July 2, 1912.
5 SHEETS—SHEET 2.
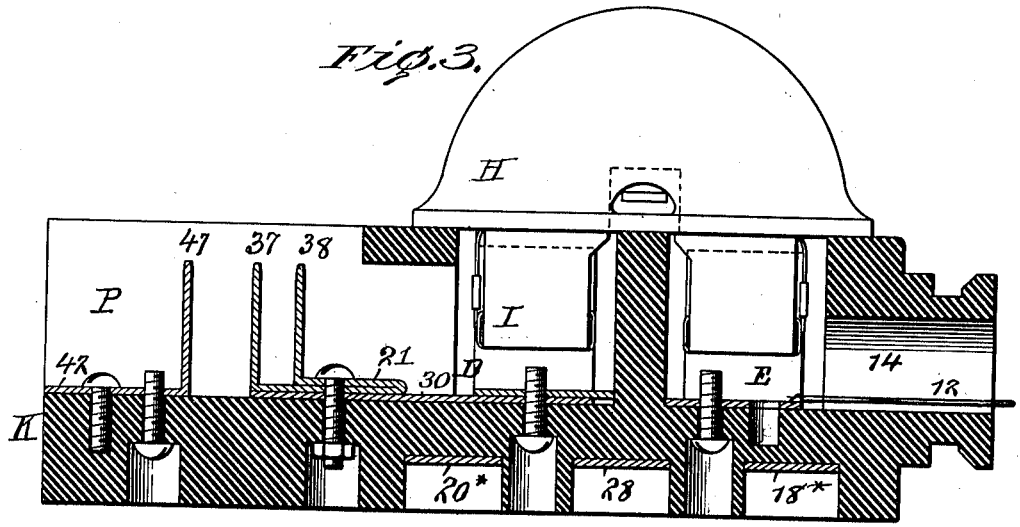
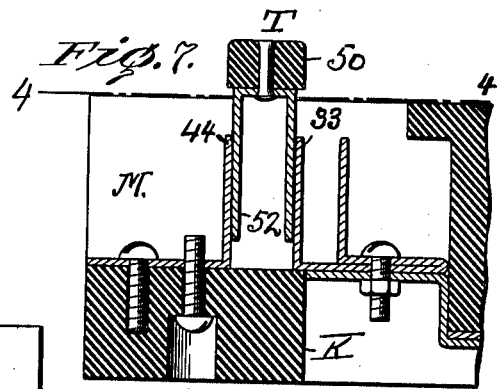
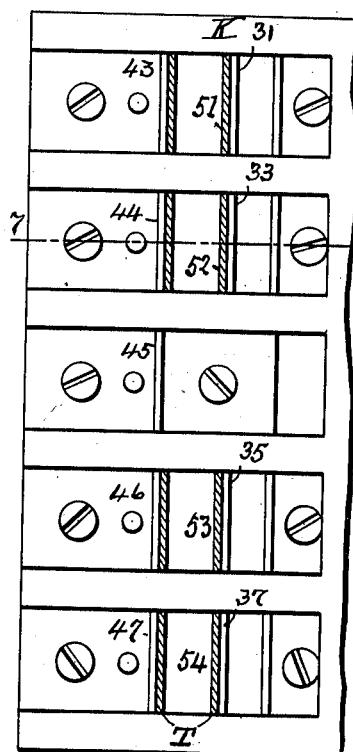
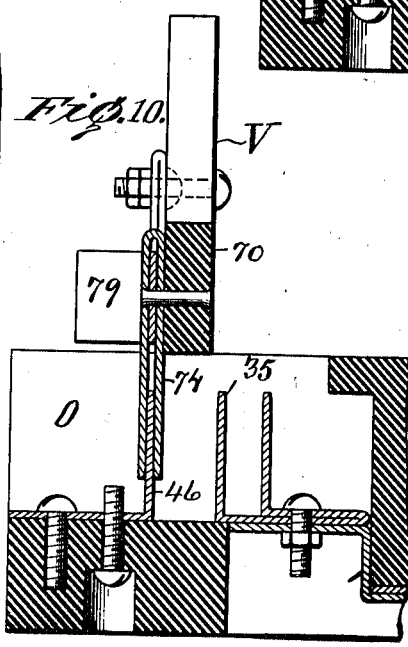

T. E. MURRAY.
METER TESTING SERVICE CUT-OUT.
APPLICATION FILED DEC. 8, 1909.

1,031,363.

Patented July 2, 1912.
5 SHEETS—SHEET 3.

Witnesses:
Gertrude T. Porter.
May T. McGarry.

Inventor
Thomas E. Murray
by Park Benjamin
his Attorney.

T. E. MURRAY.
METER TESTING SERVICE CUT-OUT.
APPLICATION FILED DEC. 8, 1909.
1,031,363.
Patented July 2, 1912.
5 SHEETS—SHEET 4.
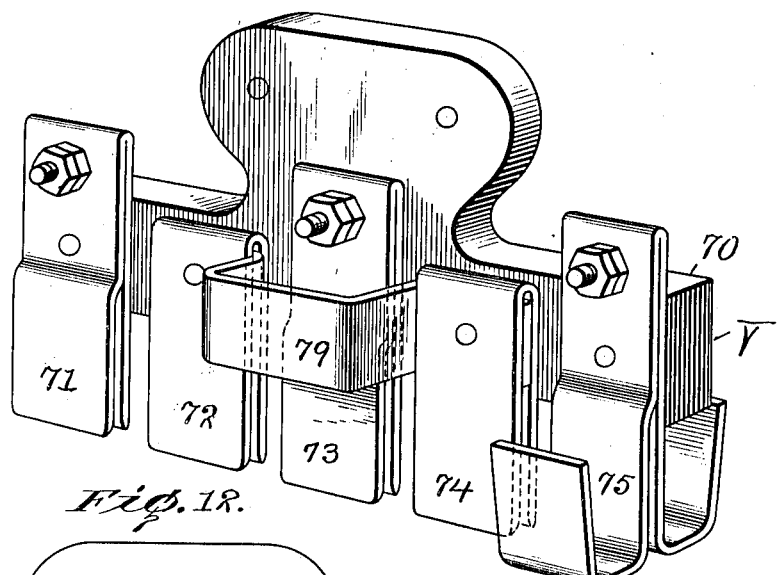
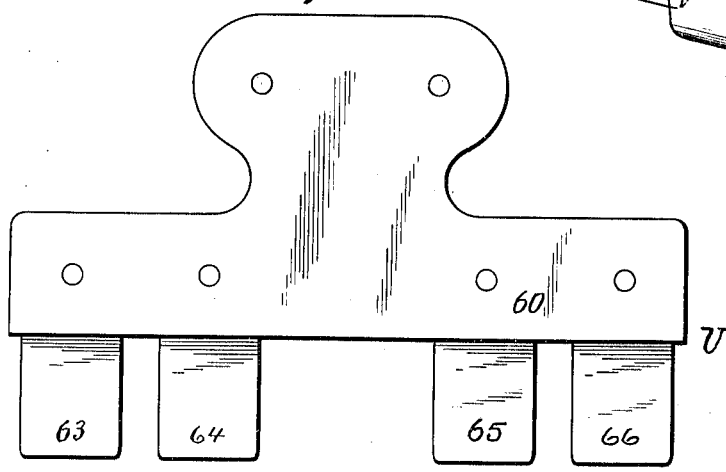
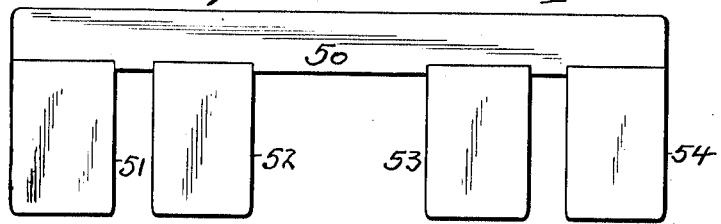

T. E. MURRAY.
METER TESTING SERVICE CUT-OUT.
APPLICATION FILED DEC. 8, 1909.

1,031,363.

Patented July 2, 1912.
5 SHEETS—SHEET 5.

WITNESSES:
May J. McGarry
Marie L. Breslin

INVENTOR.
Thomas E. Murray
BY
his ATTORNEY.

UNITED STATES PATENT OFFICE.

THOMAS E. MURRAY, OF NEW YORK, N. Y.

METER-TESTING SERVICE CUT-OUT.

1,031,363.   Specification of Letters Patent.   Patented July 2, 1912.

Application filed December 8, 1909. Serial No. 532,050.

*To all whom it may concern:*

Be it known that I, THOMAS E. MURRAY, a citizen of the United States, residing at New York, in the county of New York and State of New York, have invented a certain new and useful Improvement in Meter-Testing Service Cut-Outs, of which the following is a specification.

The invention is a meter testing service cut-out, for electrical installations, receiving current over a three wire supply system.

It has for its object to simplify the testing of consumers' meters while in service. To this end I combine certain removable gang plugs with terminals arranged directly on the cut-out support in such a way, as that by simply applying said plugs to contacts on said terminals, I am enabled to establish or cut off service, to remove the meter, or to test the meter with artificial load; the meter removal and testing being, in each case, accomplished without interruption of the customer's service.

Figure 5:
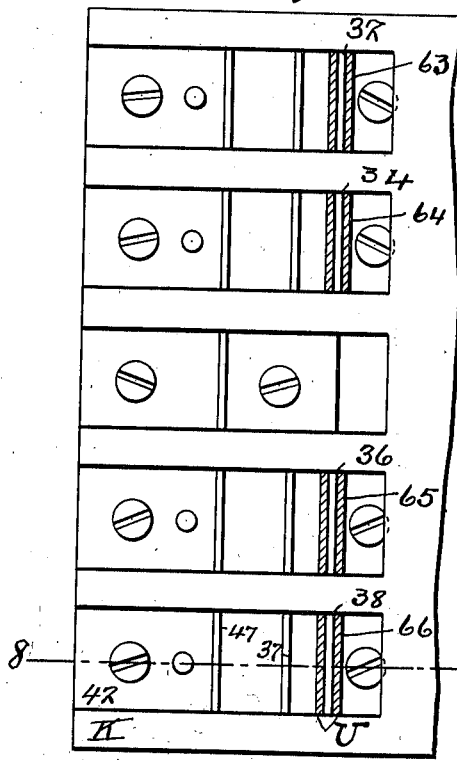
Figure 6:
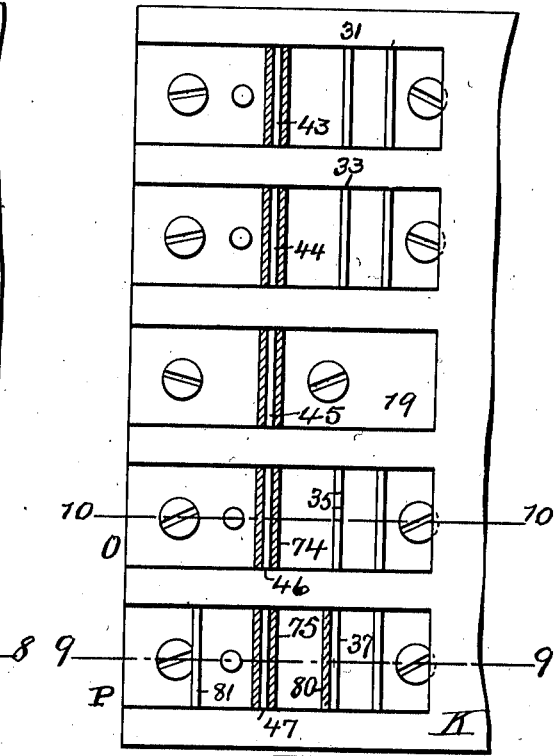
Figure 8:
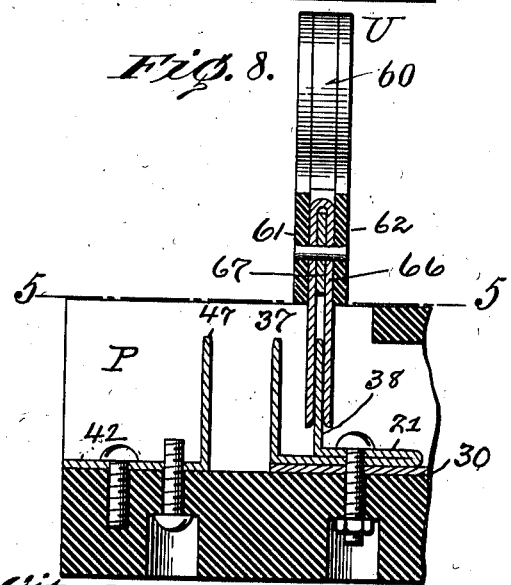
Figure 9:
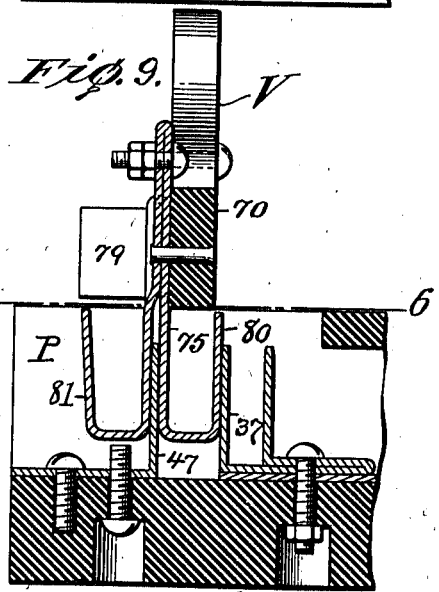
Figure 14:
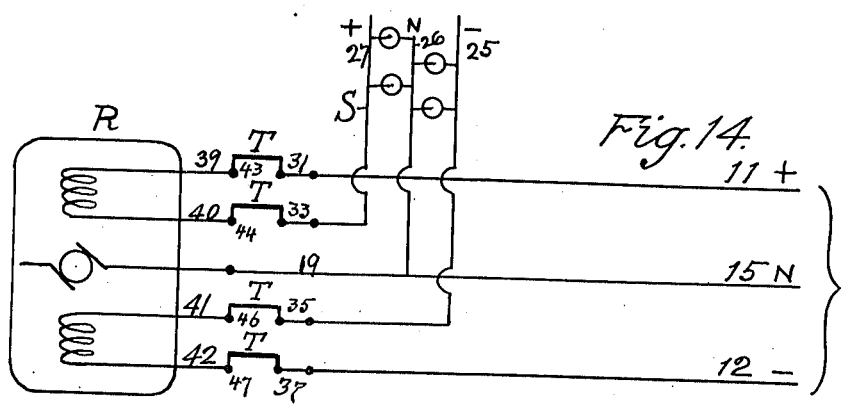
Figure 15:
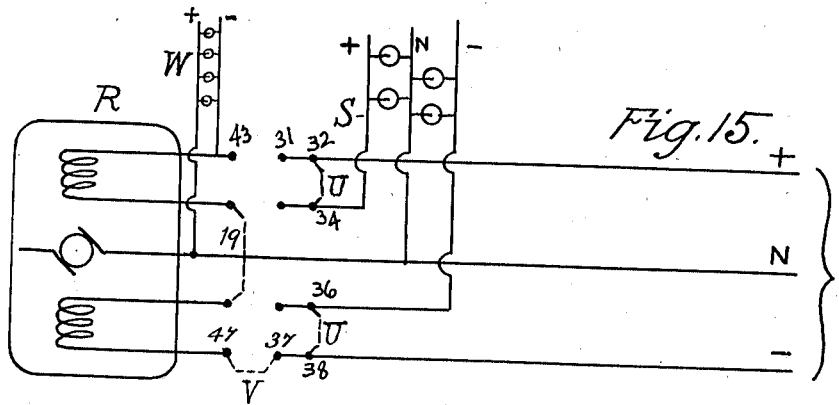
Figure 16:
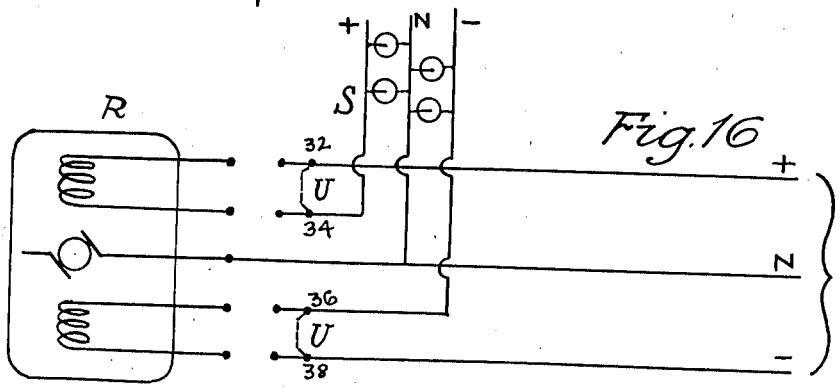

In the accompanying drawings—Figure 1 is a plan view of my meter testing service cut-out, with the fuse cases and removable gang plugs removed. Fig. 2 is a section on the line 2, 2, of Fig. 1. Fig. 3 is a section on line 3, 3, of Fig. 1, showing a fuse case in place. Figs. 4, 5 and 6 are horizontal sections of the projection respectively on the lines 4, 4, of Fig. 7; 5, 5, of Fig. 8 and 6, 6, of Fig. 9. Fig. 7 is a section on the line 7, 7, of Fig. 4. Fig. 8 is a section on the line 8, 8, of Fig. 5, and Fig. 9 is a section on the line 9, 9, of Fig. 6. Fig. 10 is a section on the line 10, 10, of Fig. 6. Fig. 11 is a perspective view of the gang plug V, and Figs. 12 and 13 are elevations of the gang plugs U and T. Figs. 14, 15 and 16 are diagrams, Fig. 14 illustrating the service connections, Fig. 15, the testing of the meter with artificial load, and Fig. 16, the removal of the meter without interrupting customer's service.

Similar numbers and letters of reference indicate like parts.

A is the base block or support preferably formed of insulating refractory material, such as porcelain. In said block are four sockets B, C, D, E, in each of which is secured a metal plate having its ends bent upwardly to form spring contact arms. The positive and negative main conductors 11, 12 enter the block through passages 13, 14 in a wall thereof and are respectively connected to plates in the sockets C, E. The neutral conductor 15 enters the block through a passage 15* and is connected to a metal strip 16 on the bottom of a recess formed in said block between the pairs of recesses B, C and D, E. Fuse plugs, one of which is shown at H, Fig. 3, also of porcelain or like material containing fuses having their terminals connected in the usual way to end contact plates I, fit in the sockets B, C and D, E and establish electrical connection with the spring arms therein.

On the block A is a projection K in which are five recesses L, M, N, O, P. In said recesses are metal strips 17, 18, 19, 20, 21. On the side of the support A is a projection Q, in which are three recesses which receive metal strips 22, 23, 24, to which are respectively connected the local conductors 25, 26, 27. The neutral local conductor is connected by metal strips 28 (dotted lines Fig. 1) with the strip 16. The strip 17 in recess L connects by metal strip 29 with the spring arms in recess B. The strip 18 in recess M is connected to a strip 18* which extends through a channel on the under side of support A, and hence below strip 29, and connects with local conductor 27. The strip 21 in recess P connects by metal strip 30 with the spring arms in recess D. The strip 20 in recess O connects to a strip 20* which extends through a channel on the under side of the support A, and hence below strip 30, with local conductor 25. On each strip 17, 18, 20, 21 are two parallel upwardly extending contact plates, namely, 31, 32 on strip 17; 33, 34 on strip 18; 35, 36 on strip 20; 37, 38 on strip 21. The plates 31, 33, 35 and 37 are in line across the projection K, and the plates 32, 34, 36 and 38 are similarly placed. In the outer ends of the recesses L, M, O, P are separate metal strips 39, 40, 41, 42, on which are upwardly extending contact plates 43, 44, 46, 47. On the strip 19 in recess N is an upwardly extending contact plate 45. The contact plates 43, 44, 45, 46 and 47 are in line across the projection K.

Referring now to the diagram, Fig. 14, which shows the service connection, R represents a meter of usual construction, to the terminals of which the strips 39, 40, 41 42 and 19 are connected. To establish the connection I provide the gang plug T, Fig. 13, which comprises a holder 50 of wood, or like material, from which depend four connected pairs of contact plates 51, 52, 53, 54. These pairs of plates are respectively inserted between the vertical contact plates 43, 44, 46, 47 on strips 39, 40, 41, 42, and the vertical contact plates 31, 33, 35, 37 on strips 17, 18, 20, 21, as shown in Fig. 7, and in this way electrical connection is established, as shown in Fig. 14, to both the local installation represented at S and the meter R.

In Fig. 16 I illustrate how the meter may be removed without interrupting the local service. To this end I use a gang plug U, Figs. 8 and 12, which comprises a holder 60 of insulating material, preferably formed of two parallel bars 61, 62, between which are clamped four pairs of contact plates 63, 64, 65, 66. The plates 63, 64 are connected by a bridge piece 67, and the plates 65, 66 by a bridge piece 68. The gang plug T being in place, as already described, the gang plug U is applied to the vertical contact plates 32, 34, 36, 38, as shown in Figs. 5 and 8, thus bridging plates 32, 34 and 36, 38. When this is done the gang plug T is removed and then, as is obvious from Fig. 16, the meter may be disconnected without interrupting the service circuit.

In Fig. 15 I illustrate how the meter may be tested with artificial load. To this end, in addition to the gang plug U, I use another gang plug V, shown in Fig. 11. This comprises a holder 70 of insulating material, from which depend three pairs of contact plates 71, 73, 75 on which are binding posts as shown. Between the pairs of plates 71 and 73, and also between the pairs of plates 73, 75, are secured pairs of contact plates 72, 74, and these are connected by an outwardly bent bridge piece 79. The artificial load represented at W, Fig. 15, is connected to the terminals, 71 and 73 on the holder. In making the test, the gang plugs T and U being both in place, as above described, the gang plug T is first removed. The gang plug U is then applied to the vertical contact plates 43, 44, 45, 46, 47, as shown in Figs. 9 and 10. The upwardly bent end 80 of one member of the pair of plates 75 on gang plug V enters between the vertical contact plates 37 and 47 and establishes electrical connection between them. The resulting circuit connections become as shown in Fig. 15, from which it will be obvious that the meter test with artificial load may be made without interruption of the service circuit.

I claim:

1. A meter testing service cut-out, comprising a base, service, load and meter circuit terminals thereon, a meter, a gang plug coöperating with the load and service terminals for establishing direct circuit from service supply to load, and means for cutting the meter completely out of said circuit.

2. A meter testing service cut-out, comprising a base, service, load and meter circuit terminals thereon, a meter, a gang plug coöperating with the load and service terminals for establishing direct circuit from service supply to load, and a second gang plug coöperating with the service, load and meter terminals for cutting the meter out of said circuit.

3. A meter testing service cut-out, comprising a base, service, load and meter circuit terminals thereon, a meter, means for cutting the meter completely out of circuit, means for establishing current supply directly to load, a gang plug, and a meter testing device connected to said plug: the said plug coöperating with said meter and service terminals to connect said meter and testing device in said service circuit.

4. A meter testing service cut-out, comprising a base, service, load and meter circuit terminals, and connections on said base, a meter, and a gang plug coöperating with said meter terminals and said service and load terminals for simultaneously opening gaps in said connections between said meter terminals and said service and load terminals and thereby mechanically disconnecting said meter terminals from said service and load terminals.

5. A meter testing service cut-out, comprising a base, service, load and meter circuit terminals, and connections on said base, a meter, means for opening gaps in said connections between said meter terminals and said service and load terminals, and thereby mechanically disconnecting said meter terminals from said service and load terminals, and means coöperating with said service and load terminals for establishing direct circuit from service to load.

6. A meter testing service cut-out, comprising a base, service, load and meter circuit terminals, and connections on said base, a meter, a gang plug coöperating with said meter terminals for simultaneously opening gaps in said connections between said meter terminals and said service and load terminals, and thereby mechanically disconnecting said meter terminals from said service and load terminals, and a gang plug coöperating with said service and load terminals for establishing direct circuit from service to load.

7. A meter testing service cut-out, comprising a base, service, load and meter circuit terminals, and connections on said base, a meter, means for opening gaps in said connections between said meter terminals and said service and load terminals, means coöperating with said service and load terminals for establishing direct circuit from service to load, a gang plug bridging said gaps and coöperating with said service terminals, and a meter testing device normally connected to said plug: the said plug connecting said meter and testing device in circuit.

8. The combination of an electric cut-out support, the conductors of a three wire system entering the same, a meter, two separated circuit terminals 17, 18 on said support interposed in the positive conductor, two separated terminals 20, 21 on said support interposed in the negative conductor, a terminal 19 on said support connected to the neutral conductor and to one terminal of the meter, and four terminals 39, 40, 41, 42 on said support connected to the remaining meter terminals, and respectively disposed opposite to the aforesaid positive and negative terminals 17, 18, 20, 21, and a removable gang plug T constructed to close circuit between said positive and negative terminals 17, 18, 20, 21 and the four terminals 39, 40, 41, 42.

9. The combination of an electric cut-out support, the conductors of a three wire system entering the same, a meter, two separated circuit terminals 17, 18 on said support interposed in the positive conductor, two separated terminals 20, 21 on said support interposed in the negative conductor, and a removable gang plug U having two pairs 63, 64 and 65, 66 of clip arms, the arms of each pair being electrically connected and constructed respectively to close circuit between the members of each pair of separated terminals.

10. The combination of an electric cut-out support, the conductors of a three wire system entering the same, a meter, two separated circuit terminals 17, 18 on said support interposed in the positive conductor, two separated terminals 20, 21 on said support interposed in the negative conductor, a terminal 19 on said support connected to the neutral conductor and to one terminal of the meter, and four terminals 39, 40, 41, 42 on said support connected to the remaining meter terminals, and respectively disposed opposite to the aforesaid positive and negative terminals 17, 18, 20, 21, a removable gang plug U having pairs of clip arms 63, 64 and 65, 66, the arms of each pair being electrically connected and constructed respectively to close circuit between the members of each pair 17, 18 and 20, 21 of said terminals, a second removable gang plug V having clip arms 71, 72, 73, 74, 75 constructed to engage with terminals 39, 40, 19, 41, 42 and electrically connecting terminals 40, 41 and 42, 21, an artificial load, and means on said gang plug V for connecting said load to arms 73 and 75.

In testimony whereof I have affixed my signature in presence of two witnesses.

THOMAS E. MURRAY.

Witnesses:
GERTRUDE T. PORTER,
MAY T. MCGARRY.